Patented Jan. 18, 1927.

1,614,584

UNITED STATES PATENT OFFICE.

ROGER ADAMS AND JAMES MEYER DAVIDSON, OF URBANA, ILLINOIS, AND IVAN GUBELMANN, OF SOUTH MILWAUKEE, WISCONSIN, ASSIGNORS TO THE NEWPORT COMPANY, OF CARROLLVILLE, WISCONSIN, A CORPORATION OF DELAWARE.

PROCESS OF PREPARING NITRO AMINO BENZOYL O-BENZOIC ACID AND ITS DERIVATIVES.

No Drawing.   Application filed February 8, 1926.   Serial No. 86,936.

This invention relates to derivatives of benzoyl o-benzoic acid containing a nitro and amino group, and to a process of preparing the same.

It is an object of this invention to provide a process for preparing a new series of compounds, nitro amino benzoyl o-benzoic acid and its derivatives, which may be employed as intermediates in the preparation of dyes.

Other and further objects of this invention will be apparent from the disclosures in the specification and appended claims.

We have found that derivatives of benzoyl o-benzoic acid containing a nitro and amino group in ortho position may be prepared by the condensation of ammonia, or primary or secondary amines with 4-chloro-3-nitro benzoyl o-benzoic acid. The derived substances are 4-amino, or substituted 4-amino, 3-nitro benzoyl o-benzoic acids. They are compounds which are soluble in alkali to give deeply colored solutions.

The following equation represents the general reaction involved:

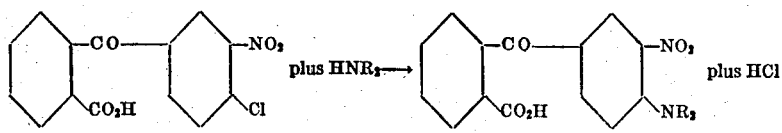

where R is a hydrogen atom, an alkyl, aryl or substituted alkyl or aryl group.

In the general method of synthesizing compounds of this series, the compound 4-chloro-3-nitro benzoyl o-benzoic acid is heated alone or in a solvent with a compound of the formula $HNR_2$, where R may represent a hydrogen atom, alkyl, aryl or substituted alkyl or aryl group. A suitable catalyst such as copper and its salts may be used in the reaction, but it is not essential. The reacting substances are heated for several hours and the condensation product at the completion of the reaction is separated out in any of the well known ways, depending upon the character of the nitrogen compound used. The product may be readily purified by recrystallization from suitable organic solvents.

Without limiting our invention to any particular procedure, the following example in which parts by weight are given illustrates the application of our invention in the preferred form:

A mixture of 10 parts of 4-chloro 3-nitro benzoyl o-benzoic acid is added to an excess of 29% aqueous ammonia to form a clear yellow solution. This mixture is then warmed on a water bath several hours, after which it is diluted with water and slightly acidified with acetic acid. The product 4-amino 3-nitro benzoyl o-benzoic acid separates out. If desired the product may be purified from nitro benzene from which it separates as yellow crystals having a melting point when pure of from 223 to 225° C.

The product obtained in the above example has the following structural formula:

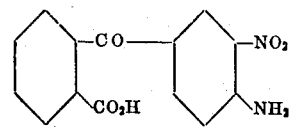

The product shows all the properties of an ortho nitro aniline derivative. It forms deeply colored solutions in alkali.

We are aware that numerous details of the process may be varied through a wide range without departing from the principles of this invention, and we do not desire limiting the patent granted otherwise than necessitated by the prior art.

We claim as our invention:

1. The method of preparing nitro amino benzoyl o-benzoic acids of the general formula:

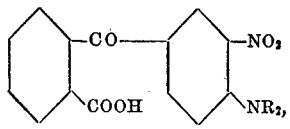

in which R represents a hydrogen atom, an alkyl, aryl or substituted alkyl or aryl group, which comprises reacting upon 4-chloro 3-nitro benzoyl o-benzoic acid with a compound of the formula $NHR_2$, in which R may be a hydrogen atom, an alkyl, aryl or substituted alkyl or aryl group.

2. The method of preparing 4-amino 3-nitro benzoyl o-benzoic acid, which comprises treating 4-chloro 3-nitro benzoyl o-benzoic acid with ammonia.

3. As a new article of manufacture a compound of the general formula

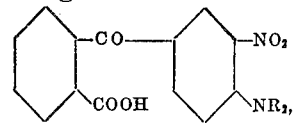

in which R represents a hydrogen atom, an alkyl, aryl or substituted alkyl or aryl group.

In testimony whereof we have hereunto subscribed our names.
ROGER ADAMS.
JAMES MEYER DAVIDSON.
IVAN GUBELMANN.